United States Patent
Tsubota (10) Patent No.: US 11,613,144 B2
(45) Date of Patent: Mar. 28, 2023

(54) PNEUMATIC TIRE

(71) Applicant: BRIDGESTONE CORPORATION, Tokyo (JP)

(72) Inventor: Takeshi Tsubota, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 600 days.

(21) Appl. No.: 16/643,004

(22) PCT Filed: Aug. 31, 2018

(86) PCT No.: PCT/JP2018/032425
§ 371 (c)(1),
(2) Date: Feb. 28, 2020

(87) PCT Pub. No.: WO2019/045061
PCT Pub. Date: Mar. 7, 2019

(65) Prior Publication Data
US 2020/0307314 A1 Oct. 1, 2020

(30) Foreign Application Priority Data
Aug. 31, 2017 (JP) .............................. JP2017-167969

(51) Int. Cl.
| | |
|---|---|
| *B60C 1/00* | (2006.01) |
| *B60C 3/02* | (2006.01) |
| *B60C 9/02* | (2006.01) |
| *B60C 17/08* | (2006.01) |
| *C08K 3/36* | (2006.01) |
| *C08K 5/00* | (2006.01) |
| *C08K 5/40* | (2006.01) |
| *C08K 5/435* | (2006.01) |
| *C08K 5/5465* | (2006.01) |
| *C08L 7/00* | (2006.01) |
| *C08L 9/00* | (2006.01) |
| *C08L 23/18* | (2006.01) |
| *C08L 51/00* | (2006.01) |
| *C08L 51/04* | (2006.01) |

(52) U.S. Cl.
CPC .............. *B60C 1/0016* (2013.01); *B60C 3/02* (2013.01); *B60C 9/02* (2013.01); *B60C 17/08* (2013.01); *C08K 3/36* (2013.01); *C08K 5/0025* (2013.01); *C08K 5/40* (2013.01); *C08K 5/435* (2013.01); *C08K 5/5465* (2013.01); *C08L 7/00* (2013.01); *C08L 9/00* (2013.01); *C08L 23/18* (2013.01); *C08L 51/003* (2013.01); *C08L 51/04* (2013.01); *B60C 2001/0066* (2013.01)

(58) Field of Classification Search
CPC ........... B60C 1/0016; B60C 3/02; B60C 9/02; B60C 17/08; B60C 2001/0066; C08K 3/36; C08K 5/0025; C08K 5/40; C08K 5/435; C08K 5/5465; C08L 7/00; C08L 9/00; C08L 23/18; C08L 51/003; C08L 51/04

See application file for complete search history.

(56) References Cited

U.S. PATENT DOCUMENTS

| | | | |
|---|---|---|---|
| 5,769,983 A * | 6/1998 | Nishigata | B60C 17/0009 152/555 |
| 6,170,545 B1 * | 1/2001 | Kobayashi | B60C 17/065 152/157 |
| 9,416,259 B2 | 8/2016 | Mathey et al. | |
| 9,663,639 B2 | 5/2017 | Kawashima | |
| 2011/0005655 A1 | 1/2011 | Imoto | |
| 2015/0183971 A1 | 7/2015 | Kawashima | |
| 2015/0259516 A1 | 9/2015 | Mathey et al. | |
| 2015/0343843 A1 | 12/2015 | Cato et al. | |
| 2016/0376426 A1 | 12/2016 | Kimura | |
| 2017/0036492 A1 * | 2/2017 | Watanabe | B60C 17/0009 |
| 2018/0272800 A1 | 9/2018 | Kuwayama et al. | |

FOREIGN PATENT DOCUMENTS

| | | |
|---|---|---|
| CN | 101873942 A | 10/2010 |
| CN | 104379658 A | 2/2015 |
| EP | 2 072 289 A1 | 6/2009 |
| JP | 2009-143487 A | 7/2009 |
| JP | 2009-263456 A | 11/2009 |
| JP | 2012-087175 A | 5/2012 |
| JP | 2015-528844 A | 10/2015 |
| JP | 2016-504466 A | 2/2016 |
| JP | 2017-052330 A | 3/2017 |
| WO | 2009/087878 A1 | 7/2009 |
| WO | 2015/079703 A1 | 6/2015 |
| WO | 2016/143756 A1 | 9/2016 |

OTHER PUBLICATIONS

International Preliminary Report on Patentability dated Mar. 3, 2020 from the International Bureau in International Application No. PCT/JP2018/032425.
International Search Report of PCT/JP2018/032425 dated Oct. 2, 2018 [PCT/ISA/210].
Extended European Search Report dated Apr. 1, 2021 in European Application No. 18851556.3.

* cited by examiner

*Primary Examiner* — Doris L Lee
(74) *Attorney, Agent, or Firm* — Sughrue Mion, PLLC (57) ABSTRACT

Provided is a pneumatic tire having both improved run-flat durability and excellent wet grip properties; the pneumatic tire including a rubber composition used in a tread part, and a rubber support layer having a gauge thickness in a specified range; the rubber composition including specified compounded amounts of natural rubber, a terminal-modified styrene-butadiene rubber, silica, and a thermoplastic resin, wherein the rubber composition is largely strain-dependent for the storage elastic modulus.

18 Claims, 1 Drawing Sheet

PNEUMATIC TIRE

CROSS REFERENCE TO RELATED APPLICATIONS

This application is a National Stage of International Application No. PCT/JP2018/032425, filed Aug. 31, 2018, claiming priority to Japanese Patent Application No. 2017-167969, filed Aug. 31, 2017.

TECHNICAL FIELD

The present invention relates to a pneumatic tire including a tread part with improved wet grip properties and a side part having excellent run-flat durability.

BACKGROUND ART

In recent years, along with accelerating speed of vehicles, demands for higher performance tires have been also further growing. On the other hand, it is desirable that the need for a spare tire can be eliminated to meet a demand for reducing the weight of a vehicle. There is a demand for a tire that would enable the vehicle having a flat tire, which would otherwise be unable to travel without fixing the flat tire because of reduced filling internal pressure of the tire, to continue to travel and move without fixing by immediate repair or exchange of the tire at least to a place where the flat tire can be safely fixed. A run-flat tire, one of such tires, has been proposed and put into practical use.

Required properties for a side-support rubber of a run-flat tire known in the art have been improving run-flat durability and maintaining ride comfort during normal driving.

To allow the run-flat tire to have intended run-flat durability, a high-stiffness support rubber is used as a load support in the inner side of the side wall part. On the other hand, the support rubber increases the ground contact pressure specifically at the tire shoulder part. As a result, the tire, if fails to exhibit sufficient grip performance because of uneven wear of the shoulder part and insufficient ground contact/deformation of the central part of the tread, would extend the braking distance. Thus, it is difficult to achieve both sufficient wearability and sufficient braking performance while providing intended run-flat durability. However, if durability of the tread itself is increased and the uneven wear is reduced, an increase in elastic modulus in turn would further reduce the deformation during ground contact so that durability of tire cannot contribute to suppressing the extension in the braking distance, after all.

A method to improve the grip performance is disclosed, for example, in Patent Document 1, in which a formulation compounding specific amounts of natural rubber, a thermoplastic resin, and silica can provide a tire having not only excellent braking performance on a wet road surface but also excellent braking performance on a dry road surface and a slippery wet road surface including a manhole.

CONVENTIONAL ART DOCUMENTS

Patent Document

Patent Document 1: PCT International Publication No. WO 2015/079703

SUMMARY OF THE INVENTION

Problems to be Solved by the Invention

There is a demand for a pneumatic tire having both excellent wear resistance and grip properties having an excellent wet property that can reduce braking distance during run-flat traveling while having intended run-flat durability.

Means to Solve Problems

Provided is a pneumatic tire that is a run-flat tire having excellent grip properties due to large deformation during ground contact and further having improved run-flat durability by reinforcing a sidewall part while having sufficient wear resistance with a tread part formed by using a rubber composition largely strain-dependent for the elastic modulus.

That is, the present invention resides in the following (1) to (11).

(1) A pneumatic tire including: a carcass as a skeleton, the carcass formed of one or more carcass plies extending in a toroidal shape across a pair of bead parts; one or more belt layers disposed on the outer side in the tire radial direction of a crown part of the carcass; a tread part forming a tread surface part disposed on the outer side in the tire radial direction of the belt layer; a pair of sidewall parts on the left and right outer side in the tire width direction of the tread part; and a rubber support layer disposed on the sidewall part; wherein a rubber composition for the tread part includes: a rubber component (A), a thermoplastic resin (B), and a reinforcing filler (C); the rubber component (A) includes 50% by mass or more of natural rubber: NR based on 100 parts by mass of the rubber component; and the rubber support layer has a gauge thickness from 4 to 15 mm.

(2) The pneumatic tire according to (1), wherein the rubber composition for the tread part compounds, from 5 to 50 parts by mass of one or more thermoplastic resins (B) selected from the group consisting of a $C_5$ resin, a $C_5$-$C_9$ resin, a $C_9$ resin, a terpene resin, a terpene-aromatic compound resin, a rosin resin, a dicyclopentadiene resin, and an alkylphenolic resin, based on 100 parts by mass of the rubber component (A).

(3) The pneumatic tire according to (1) or (2), satisfying: E'(1%, 30° C.)-E'(4%, 30° C.)>1.5 MPa, wherein a dynamic storage elastic modulus E' of the tread part at 30° C. and at 1% dynamic strain is E'(1%, 30° C.), and a dynamic storage elastic modulus E' of the tread part at 30° C. and at 4% dynamic strain is E'(4%, 30° C.).

(4) The pneumatic tire according to any one of (1) to (3), wherein the reinforcing filler (C) includes 70% by mass or more of silica in the rubber composition for the tread part.

(5) The pneumatic tire according to any one of (1) to (4), wherein the rubber composition for the tread part in the pneumatic tire includes a modified styrene-butadiene copolymer rubber: modified SBR.

(6) The pneumatic tire according to any one of (1) to (5), wherein, in the tread part, the terminal modified styrene-butadiene copolymer rubber is modified with a hydrocarbyloxysilane compound represented by General Formula (IV) below:

where q1+q2=3, with the proviso that q1 is an integer from 0 to 2, and q2 is an integer from 1 to 3; $R^{31}$ is a divalent aliphatic or alicyclic hydrocarbon group having from 1 to 20 carbons, or a divalent aromatic hydrocarbon group having from 6 to 18 carbons; $R^{32}$ and $R^{33}$ are each independently a hydrolyzable group, a monovalent aliphatic or alicyclic hydrocarbon group having from 1 to 20 carbons, or a monovalent aromatic hydrocarbon group having from 6 to 18 carbons; $R^{34}$ is a monovalent aliphatic or alicyclic hydrocarbon group having from 1 to 20 carbons, or a monovalent aromatic hydrocarbon group having from 6 to 18 carbons, where $R^{34}$s may be the same or different when q1 is 2; and $R^{35}$ is a monovalent aliphatic or alicyclic hydrocarbon group having from 1 to 20 carbons, or a monovalent aromatic hydrocarbon group having from 6 to 18 carbons, where $R^{35}$s may be the same or different when q2 is 2 or greater in General Formula (IV); or
General Formula (V):

(V)

where r1+r2=3, with the proviso that r1 is an integer from 1 to 3, and r2 is an integer from 0 to 2; $R^{36}$ is a divalent aliphatic or alicyclic hydrocarbon group having from 1 to 20 carbons, or a divalent aromatic hydrocarbon group having from 6 to 18 carbons; $R^{37}$ is a dimethylaminomethyl group, a dimethylaminoethyl group, a diethylaminomethyl group, a diethylaminoethyl group, a methylsilyl(methyl)aminomethyl group, a
methylsilyl(methyl)aminoethyl group,
a methylsilyl(ethyl)aminomethyl group,
a methylsilyl(ethyl)aminoethyl group,
a dimethylsilylaminomethyl group, a dimethylsilylaminoethyl group, a monovalent aliphatic or alicyclic hydrocarbon group having from 1 to 20 carbons, or a monovalent aromatic hydrocarbon group having from 6 to 18 carbons, where $R^{37}$s may be the same or different when r1 is 2 or greater; and $R^{38}$ is a hydrocarbyloxy group having from 1 to 20 carbons, a monovalent aliphatic or alicyclic hydrocarbon group having from 1 to 20 carbons, or a monovalent aromatic hydrocarbon group having from 6 to 18 carbons, where $R^{38}$s may be the same or different when r2 is 2 in General Formula (V).

(7) The pneumatic tire according to any one of (1) to (6), wherein the rubber composition of the rubber support layer is a rubber composition formed by compounding: a filler (b), a thermosetting resin (c), a methylene donor (d), a thiuram vulcanization accelerator (e), and a sulfenamide vulcanization accelerator (f), based on 100 parts by mass of a rubber component (a) containing 20% by mass or more of a modified conjugated diene polymer.

(8) The pneumatic tire according to any one of (1) to (7), wherein the rubber composition of the rubber support layer is a rubber composition formed by compounding: from 60 to 100 parts by mass of the filler (b), from 0.9 to 2.4 parts by mass of the thermosetting resin (c), from 0.07 to 0.2 parts by mass of the methylene donor (d), from 1.5 to 2.1 parts by mass of the thiuram vulcanization accelerator (e), and from 3.2 to 4.5 parts by mass of the sulfenamide vulcanization accelerator (f), based on 100 parts by mass of the rubber component containing 20% by mass or more of a modified conjugated diene polymer.

(9) The pneumatic tire according to any one of (1) to (8), wherein compounded amounts of the filler (b) and the thermosetting resin (c) in the rubber composition of the rubber support layer satisfy the following relationship:

1.0≤[mass ratio{compounded amount of thermosetting resin(c)/compounded amount of filler (b)}]×100≤4.0 (XIV)

(10) The pneumatic tire according to any one of (1) to (9), wherein compounded amounts of the thiuram vulcanization accelerator (e) and the sulfenamide vulcanization accelerator (f) in the rubber composition of the rubber support layer satisfy the following relationship:

0.45≤mass ratio[compounded amount of thiuram vulcanization accelerator(e)/compounded amount of sulfenamide vulcanization accelerator(f)]≤0.65 (XV)

(11) The pneumatic tire according to any one of (1) to (10), wherein the pneumatic tire is a run-flat tire.

According to (1), a pneumatic tire including a tread part having excellent grip properties and a tough rubber support layer is provided.

According to (2) to (6), grip properties are further improved in the tread part.

According to (7) to (11), the reinforced rubber support layer further improves run-flat durability.

According to (12), a run-flat tire including the features of (1) to (11) and having both excellent run-flat durability and excellent grip properties is provided.

BRIEF DESCRIPTION OF DRAWINGS

FIG. 1 A schematic view illustrating a cross section of an embodiment of a tire according to the present invention Embodiments to carry out the invention In a pneumatic tire according to the present invention including a tread part and a rubber support layer, a rubber composition for the tread part is formed by compounding a rubber component (A) containing 50% by mass or more of natural rubber, in which the rubber composition for the tread part is formed by compounding from 5 to 50 parts by mass of at least one thermoplastic resin (B) selected from among a $C_5$ resin, a $C_5$-$C_9$ resin, a $C_9$ resin, a terpene resin, a terpene-aromatic compound resin, a rosin resin, a dicyclopentadiene resin, and an alkylphenolic resin, based on 100 parts by mass of the rubber component; and a filler (C) containing silica. In addition, the rubber composition for the tread part preferably satisfies E'(1%, 30° C.)−E'(4%, 30° C.)≥1.5 MPa, where a dynamic storage elastic modulus E' of the tread part at 30° C. and at 1% dynamic strain is E'(1%, 30° C.), and a dynamic storage elastic modulus E' of the tread part at 30° C. and at 4% dynamic strain is E'(4%, 30° C.)

<<Rubber Component (A)>>

The rubber component (A) used in the rubber composition according to an embodiment of the present invention contains 50% by mass or more, suitably 70% by mass or more, and more suitably 80% by mass or more of natural rubber: NR. The rubber component (A) compounding 50% by mass or more of the NR provides an effect that is likely to exhibit a sufficient effect due to containing the $C_5$ resin described below.

Furthermore, the rubber component (A) preferably contains from 5 to 50% by mass, suitably from 5 to 30% by mass, and more suitably from 10 to 20% by mass of a terminal-modified styrene-butadiene copolymer rubber: terminal modified SBR. Compounding the rubber component containing the terminal-modified SBR elevates the glass transition point: Tg of the rubber composition and can improve braking performance on a dry road surface and steering stability. The rubber component (A) containing less than 5% by mass of the SBR may fail to provide sufficient effects described above. In addition, the rubber component (A) containing more than 50% by mass of the terminal modified SBR inevitably contains less than 50% by mass of the NR so that the above effects due to compounding the NR would be less likely provided. Additionally, such a rubber component (A) may cause problems in that heat build-up of the rubber would be increased, and this would be likely to increase rolling resistance; and in that flexibility of the rubber would be reduced, and thus road surface followability on a slippery wet road surface would be less likely to be obtained.

The rubber component (A) can appropriately contain a rubber, such as a butadiene rubber: BR, an acrylonitrile-butadiene copolymer rubber: NBR, a chloroprene rubber: CR, a polyisoprene rubber: IR, and a butyl rubber: IIR, as an additional rubber material.

<<Thermoplastic Resin (B)>>

The rubber composition according to the present invention is formed by compounding from 5 to 50 parts by mass of at least one thermoplastic resin (B) selected from among a $C_5$ resin, a $C_5$-$C_9$ resin, a $C_9$ resin, a terpene resin, a terpene-aromatic compound resin, a rosin resin, a dicyclopentadiene resin, and an alkylphenolic resin, based on 100 parts by mass of the rubber component. The rubber composition according to the present invention compounding a prescribed amount of the thermoplastic resin (B) has an elevated glass transition point: Tg and an improved loss tangent: tan 5 at 0° C., and thus this can improve performance of the tire mainly on a wet road surface. The rubber component (A) in the rubber composition according to the present invention contains 50% by mass or more of the NR, as described above, and because the thermoplastic resin (B) is highly compatible with the NR so that the effect described above can be likely provided.

In the present invention, the "$C_5$ resin" refers to a $C_5$ synthetic petroleum resin and refers to a solid polymer obtained by polymerizing a $C_5$ fraction using a Friedel-Crafts catalyst, for example, such as $AlCl_3$ or $BF_3$. Specifically, the $C_5$ resin is exemplified by a copolymer formed mainly of isoprene, cyclopentadiene, 1,3-pentadiene, and 1-pentene, a copolymer of 2-pentene and dicyclopentadiene, and a polymer formed mainly of 1,3-pentadiene. In addition, the use of the $C_5$ resin as the thermoplastic resin (B) can also further improve braking performance on icy and snowy road surfaces.

In the present invention, the "$C_5$-$C_9$ resin" refers to a $C_5$-$C_9$ synthetic petroleum resin and refers to a solid polymer obtained by polymerizing a $C_5$-$C_9$ fraction using a Friedel-Crafts catalyst, for example, such as $AlCl_3$ or $BF_3$. Examples of the "$C_5$-$C_9$ resin" include copolymers formed mainly of styrene, vinyl toluene, α-methylstyrene, and indene. In an embodiment of the present invention, the $C_5$-$C_9$ resin is preferably a resin containing a small amount of a component of $C_9$ or greater in terms of compatibility with the component (A). Here, "containing a small amount of a component of $C_9$ or greater" means that the amount of the component of $C_9$ or greater in the total resin amount is less than 50% by mass and preferably 40% by mass or less.

In addition, the use of the $C_5$-$C_9$ resin as the thermoplastic resin (B) can also further improve handling properties.

Here, the $C_5$-$C_9$ fraction used in the polymerization of the solid polymer as the "$C_5$-$C_9$ resin" contains a fraction other than the $C_5$ fraction and a $C_9$ fraction.

In the present invention, the "$C_9$ resin" refers to a $C_9$ synthetic petroleum resin and refers to a solid polymer obtained by polymerizing a $C_9$ fraction using a Friedel-Crafts catalyst, for example, such as $AlCl_3$ or $BF_3$. Examples of the "$C_9$ resin" include copolymers formed mainly of indene, α-methylstyrene, and vinyl toluene. In addition, the use of the $C_9$ resin as the thermoplastic resin (B) can also further improve handling performance.

The terpene resin is a solid resin obtained by compounding turpentine oil obtained simultaneously during obtaining rosin from a tree of the pine genus or a polymer component separated from turpentine oil, and polymerizing the blend using a Friedel-Crafts catalyst. Examples of the terpene resin include a β-pinene resin and an α-pinene resin. In addition, representative examples of the terpene-aromatic compound resin may include a terpene-phenolic resin. The terpene-phenolic resin can be obtained by a method of allowing a terpene and a phenol of various types to react using a Friedel-Crafts catalyst, or further condensing the resulting product with formalin. The raw material terpene is not particularly limited and preferably a monoterpene hydrocarbon, such as α-pinene or limonene; more preferably a terpene containing α-pinene; and particularly preferably α-pinene. In an embodiment of the present invention, a terpene-phenolic resin having a low proportion of a phenolic component is suitable. Here, "having a low proportion of a phenolic component" means that the amount of the phenolic component in the total resin amount is less than 50% by mass and preferably 40% by mass or less.

In addition, the use of the terpene-aromatic compound resin, particularly a terpene-phenolic resin, as the thermoplastic resin (B), can also further improve handling performance.

Examples of the rosin resin include natural resin rosins, such as gum rosin, tall oil rosin, and wood rosin contained in a raw pine resin or tall oil. In addition, examples of modified rosins, rosin derivatives, and modified rosin derivatives include rosins, such as polymerized rosin and partially hydrogenated polymerized rosin; glycerin ester rosin, partially hydrogenated glycerin ester rosin, and fully hydrogenated glycerin ester rosin; and pentaerythritol ester rosin and partially hydrogenated pentaerythritol ester rosin, and polymerized pentaerythritol ester rosin. Furthermore, the use of the rosin resin as the thermoplastic resin (B) can also further improve handling performance.

The dicyclopentadiene resin refers to a resin obtained by polymerizing dicyclopentadiene using a Friedel-Crafts catalyst, for example, such as $AlCl_3$ or $BF_3$. Specific examples of commercially available products of the dicyclopentadiene resin include resins, such as Quintone 1920 and Quintone 1105 manufactured by Zeon Corporation, and Marukarez M-890A manufactured by Maruzen Petrochemical Co., Ltd. In addition, the use of the dicyclopentadiene resin as the thermoplastic resin (B) can also further improve braking performance on icy and snowy road surfaces.

Examples of the alkylphenolic resin include alkylphenol-acetylene resins, such as a p-tert-butylphenol-acetylene resin; and alkylphenol-formaldehyde resins having a low degree of polymerization.

In addition, the use of the alkylphenolic resin as the thermoplastic resin (B) can also further improve handling performance. Specifically, examples of the alkylphenolic resin include trade designated Hitanol 1502, manufactured by Hitachi Chemical Co., Ltd., which is a novolac alkylphenolic resin, and trade designated Koresin, manufactured by BASF Corporation, which is a p-t-butylphenol acetylene resin.

The thermoplastic resin that can be used has a softening point of 100° C. or higher and further preferably in a range from 100 to 150° C. as measured based on ASTM E28-58-T.

The resin may be used alone, or two or more resins may be used in a mixture. The rubber component compounds from 5 to 50 parts by weight and preferably from 10 to 30 parts by weight of the resin, based on 100 parts by weight of the rubber component. The compounded amount of the thermoplastic resin (B) of 5 to 50 parts by mass based on 100 parts by mass of the rubber component (A) enables the tire to have desired fracture properties and wear resistance. The compounded amount of the thermoplastic resin (B) of 5 parts by mass or more allows the tire to sufficiently exhibit braking performance on a wet road surface. The compounded amount of the thermoplastic resin (B) of 50 parts by mass or less provides desired wear resistance and fracture properties.

<<Reinforcing Filler (C)>>

The rubber composition according to the present invention compounds from 20 to 120 parts by mass and preferably from 50 to 100 parts by mass of the reinforcing filler (C), based on 100 parts by mass of the rubber component (A). In addition, the reinforcing filler (C) contains 70% by mass or more, preferably from 80 to 100% by mass, and more preferably from 90 to 100% by mass of silica. In other words, the rubber composition according to an embodiment of the present invention contains from 10 to 120 parts by mass and preferably from 45 to 100 parts by mass of silica, based on 100 parts by mass of the rubber component (A). The compounded amount of the reinforcing filler (C) of 20 to 120 parts by mass based on 100 parts by mass of the rubber component (A) enables the rubber component (A) to exhibit the reinforcing effect without impairing properties of the rubber component (A), such as the flexibility. Furthermore, the compounded amount of silica of 70% by mass or more in the reinforcing filler (C) has advantages of exhibiting the effects of reducing rolling resistance and improving braking performance on a wet road surface, and less likely to impair the flexibility of the rubber component.

The effect of compounding silica in the rubber composition according to the present invention is to enable the rubber composition to have sufficient reinforcing properties and a low heat build-up without impairing flexibility of the rubber composition in a state where the NR and the thermoplastic resin (B) are well-dispersed. Thus, the rubber composition according to the present invention, because of flexibility thereof, has high followability to a road surface with low friction coefficient, for example, a slippery wet road surface, such as a manhole, and thus can provide sufficient braking performance on such a slippery wet road surface.

Examples of the silica include wet silica, that is, hydrous silicate, dry silica, that is, silicic anhydride, calcium silicate, and aluminum silicate, and among silica, wet silica can be suitably used. The BET specific surface area of the wet silica is preferably from 40 to 350 m$^2$/g, more preferably from 150 to 300 m$^2$/g, and still more preferably from 200 to 250 m$^2$/g. Silica having a BET specific surface area in the range has an advantage of being able to provide both rubber reinforcing properties and dispersibility into the rubber component. Examples of such silica that can be used include commercially available products, such as trade designated "Nipsil AQ" and "Nipsil KQ" manufactured by Tosoh Silica Corporation and trade designated "Ultrasil VN3" manufactured by Evonik Corporation. One type of silica may be used alone, or two or more types of silica may be used in combination.

Examples of the reinforcing filler (C) that can be appropriately compounded other than silica include a carbon black, aluminum oxide, clay, alumina, talc, mica, kaolin, a glass balloon, a glass bead, calcium carbonate, magnesium carbonate, magnesium hydroxide, calcium carbonate, magnesium oxide, titanium oxide, potassium titanate, and barium sulfate.

[Terminal Modification]

In the rubber composition according to the present invention, a styrene-butadiene copolymer rubber: SBR formed by modifying the terminal group of the rubber component polymer using a modifier is preferably used. The modifier used in the present invention is a modifier containing a functional group having interactivity with silica and is preferably a modifier having at least one atom selected from a silicon atom, a nitrogen atom, and an oxygen atom.

In terms of having high affinity for the silica, the modifier is more preferably a hydrocarbyloxysilane compound.

The hydrocarbyloxysilane compound is not particularly limited but is preferably a hydrocarbyloxysilane compound represented by General Formula (I) below.

$$R^1_a\text{—Si—}(OR^2)_{4-a} \quad (I)$$

In General Formula (I), $R^1$ and $R^2$ each independently represent a monovalent aliphatic hydrocarbon group having from 1 to 20 carbons or a monovalent aromatic hydrocarbon group having from 6 to 18 carbons; and a is an integer from 0 to 2; where each $OR^2$ may be the same or different from each other when a plurality of $OR^2$s are present; and no active proton is contained in the molecule.

The hydrocarbyloxysilane compound represented by General Formula (I) above is preferably a hydrocarbyloxysilane compound represented by General Formula (II) below.

$$(II)$$

In General Formula (II), n1+n2+n3+n4=4, with the proviso that n2 is an integer from 1 to 4; n1, n3, and n4 are integers of 0 to 3; $A^1$ is at least one functional group selected from among a saturated cyclic tertiary amine compound residue, an unsaturated cyclic tertiary amine compound residue, a ketimine residue, a nitrile group, an isocyanate group, a thioisocyanate group, an epoxy group, a thioepoxy group, a trihydrocarbyl isocyanurate ester group, a dihydrocarbyl carbonate ester group, a nitrile group, a pyridine group, a ketone group, a thioketone group, an aldehyde group, a thioaldehyde group, an amide group, a carboxylate ester group, a thiocarboxylate ester group, a metal salt of a carboxylate ester, a metal salt of a thiocarboxylate ester, a carboxylic anhydride residue, a carboxylic halide residue, and a primary or secondary amino group or a mercapto group including a hydrolyzable group, where $A^1$s may be the same or different when n4 is 2 or greater, and $A^1$ may be a divalent group bonded to Si to form a ring structure; $R^{21}$ is a monovalent aliphatic or alicyclic hydrocarbon group having from 1 to 20 carbons, or a monovalent aromatic hydrocarbon group having from 6 to 18 carbons, where $R^{21}$s may be the same or different when n1 is 2 or greater; $R^{23}$ is a monovalent aliphatic or alicyclic hydrocarbon group having from 1 to 20 carbon atoms, a monovalent aromatic hydrocarbon group having from 6 to 18 carbons, or a halogen atom selected from fluorine, chlorine, bromine, and iodine, where $R^{23}$s may be the same or different when n3 is 2 or greater; and $R^{22}$ is a monovalent aliphatic or alicyclic hydrocarbon group having from 1 to 20 carbons, or a monovalent aromatic hydrocarbon group having from 6 to 18 carbons, where each $R^{22}$ may contain a nitrogen atom and/or a silicon atom, and $R^{22}$s may be the same or different from each other when n2 is 2 or greater, or alternatively $R^{22}$s are bonded together to form a ring; and $R^{24}$ is a divalent aliphatic or alicyclic hydrocarbon group having from 1 to 20 carbons, or a divalent aromatic hydrocarbon group having from 6 to 18 carbons, where $R^{24}$s may be the same or different when n4 is 2 or greater.

The hydrolyzable group in the primary or secondary amino group having a hydrolyzable group or in the mercapto group having a hydrolyzable group is preferably a trimethylsilyl group or a tert-butyldimethylsilyl group and particularly preferably a trimethylsilyl group.

Note that "a monovalent aliphatic or alicyclic hydrocarbon group having from 1 to 20 carbons" refers to "a monovalent aliphatic hydrocarbon group having from 1 to 20 carbons or a monovalent alicyclic hydrocarbon group having from 3 to 20 carbons." The same applies to the divalent hydrocarbon group.

Furthermore, the hydrocarbyloxysilane compound represented by General Formula (I) above is more preferably a hydrocarbyloxysilane compound represented by General Formula (III) below.

(III)

In General Formula (III), p1+p2+p3=2, with the proviso that p2 is an integer from 1 to 2, p1 and p3 are integers of 0 to 1, $A^2$ is NRa or sulfur, and Ra is a monovalent hydrocarbon group, a hydrolyzable group, or a nitrogen-containing organic group. The hydrolyzable group is preferably a trimethylsilyl group or a tert-butyldimethylsilyl group and particularly preferably a trimethylsilyl group. $R^{25}$ is a monovalent aliphatic or alicyclic hydrocarbon group having from 1 to 20 carbons, or a monovalent aromatic hydrocarbon group having from 6 to 18 carbons; $R^{27}$ is a monovalent aliphatic or alicyclic hydrocarbon group having from 1 to 20 carbons, a monovalent aromatic hydrocarbon group having from 6 to 18 carbons, or a halogen atom selected from fluorine, chlorine, bromine, and iodine; $R^{26}$ is a monovalent aliphatic or alicyclic hydrocarbon group having from 1 to 20 carbons, or a monovalent aromatic hydrocarbon group having from 6 to 18 carbons, or a nitrogen-containing organic group, where each $R^{26}$ may contain a nitrogen atom and/or a silicon atom, and $R^{26}$s are the same or different from each other when p2 is 2, or alternatively $R^{26}$s are bonded together to form a ring; and $R^{28}$ is a divalent aliphatic or alicyclic hydrocarbon group having from 1 to 20 carbons, or a divalent aromatic hydrocarbon group having from 6 to 18 carbons.

Furthermore, the hydrocarbyloxysilane compound represented by General Formula (I) above is more preferably a hydrocarbyloxysilane compound represented by General Formula (IV) or (V) below.

(IV)

In General Formula (IV), q1+q2=3, with the proviso that q1 is an integer from 0 to 2, and q2 is an integer from 1 to 3; $R^{31}$ is a divalent aliphatic or alicyclic hydrocarbon group having from 1 to 20 carbons, or a divalent aromatic hydrocarbon group having from 6 to 18 carbons; $R^{32}$ and $R^{33}$ are each independently a hydrolyzable group, a monovalent aliphatic or alicyclic hydrocarbon group having from 1 to 20 carbons, or a monovalent aromatic hydrocarbon group having from 6 to 18 carbons; $R^{34}$ is a monovalent aliphatic or alicyclic hydrocarbon group having from 1 to 20 carbons, or a monovalent aromatic hydrocarbon group having from 6 to 18 carbons, where $R^{34}$s may be the same or different when q1 is 2; and $R^{35}$ is a monovalent aliphatic or alicyclic hydrocarbon group having from 1 to 20 carbons, or a monovalent aromatic hydrocarbon group having from 6 to 18 carbons, where $R^{35}$s may be the same or different when q2 is 2 or greater.

(V)

In General Formula (V), r1+r2=3, with the proviso that r1 is an integer from 1 to 3, and r2 is an integer from 0 to 2; $R^{36}$ is a divalent aliphatic or alicyclic hydrocarbon group having from 1 to 20 carbons, or a divalent aromatic hydrocarbon group having from 6 to 18 carbons; $R^{37}$ is a dimethylaminomethyl group, a dimethylaminoethyl group, a diethylaminomethyl group, a diethylaminoethyl group, a methylsilyl (methyl)aminomethyl group, a methylsilyl(methyl) aminoethyl group, a methylsilyl(ethyl)aminomethyl group, a methylsilyl(ethyl)aminoethyl group, a dimethylsilylaminomethyl group, a dimethylsilylaminoethyl group, a monovalent aliphatic or alicyclic hydrocarbon group having from 1 to 20 carbon atoms, or a monovalent aromatic hydrocarbon group having from 6 to 18 carbons, where $R^{37}$s may be the same or different when r1 is 2 or greater; and $R^{38}$ is a hydrocarbyloxy group having from 1 to 20 carbons, a monovalent aliphatic or alicyclic hydrocarbon group having from 1 to 20 carbons, or a monovalent aromatic hydrocarbon group having from 6 to 18 carbons, where $R^{38}$s may be the same or different when r2 is 2.

Furthermore, the modifier used in an embodiment of the present invention is preferably a hydrocarbyloxysilane compound including two or more nitrogen atoms represented by General Formula (VI) or (VII) below.

(VI)

In General Formula (VI) above, TMS is a trimethylsilyl group; $R^{40}$ is a trimethylsilyl group, a monovalent aliphatic or alicyclic hydrocarbon group having from 1 to 20 carbons, or a monovalent aromatic hydrocarbon group having from 6 to 18 carbons; $R^{41}$ is a hydrocarbyloxy group having from 1 to 20 carbons, a monovalent aliphatic or alicyclic hydrocarbon group having from 1 to 20 carbons, or a monovalent aromatic hydrocarbon group having from 6 to 18 carbons; and $R^{42}$ is a divalent aliphatic or alicyclic hydrocarbon group having from 1 to 20 carbons, or a divalent aromatic hydrocarbon group having from 6 to 18 carbons.

(VII)

In General Formula (VII) above, TMS is a trimethylsilyl group; $R^{43}$ and $R^{44}$ are each independently a divalent aliphatic or alicyclic hydrocarbon group having from 1 to 20 carbons, or a divalent aromatic hydrocarbon group having from 6 to 18 carbons; and $R^{45}$ is a monovalent aliphatic or alicyclic hydrocarbon group having from 1 to 20 carbons, or a monovalent aromatic hydrocarbon group having from 6 to 18 carbons, where the plurality of $R^{45}$s may be the same or different.

In addition, the hydrocarbyloxysilane compound represented by General Formula (I) above is preferably a hydrocarbyloxysilane compound represented by General Formula (VIII) below.

(VIII)

In General Formula (VIII) above, s1+s2=3, with the proviso that s1 is an integer from 0 to 2, and s2 is an integer from 1 to 3; TMS is a trimethylsilyl group; $R^{46}$ is a divalent aliphatic or alicyclic hydrocarbon group having from 1 to 20 carbons, or a divalent aromatic hydrocarbon group having from 6 to 18 carbons; and $R^{47}$ and $R^{48}$ are each independently a monovalent aliphatic or alicyclic hydrocarbon group having from 1 to 20 carbons, or a monovalent aromatic hydrocarbon group having from 6 to 18 carbons. The plurality of $R^{47}$ or $R^{48}$ may be the same or different.

Furthermore, the modifier used in an embodiment of the present invention is preferably a hydrocarbyloxysilane compound represented by General Formula (IX) below.

(IX)

In General Formula (IX), X is a halogen atom; $R^{49}$ is a divalent aliphatic or alicyclic hydrocarbon group having from 1 to 20 carbons, or a divalent aromatic hydrocarbon group having from 6 to 18 carbons; $R^{50}$ and $R^{51}$ are each independently a hydrolyzable group, a monovalent aliphatic or alicyclic hydrocarbon group having from 1 to 20 carbons, or a monovalent aromatic hydrocarbon group having from 6 to 18 carbons, or alternatively $R^{50}$ and $R^{51}$ are bonded to form a divalent organic group; and $R^{52}$ and $R^{53}$ are each independently a halogen atom, a hydrocarbyloxy group, a monovalent aliphatic or alicyclic hydrocarbon group having from 1 to 20 carbons, or a monovalent aromatic hydrocarbon group having from 6 to 18 carbons. $R^{50}$ and $R^{51}$ are preferably hydrolyzable groups, and the hydrolyzable groups are preferably trimethylsilyl groups or tert-butyldimethylsilyl groups and particularly preferably trimethylsilyl groups.

The hydrocarbyloxysilane compound represented by General Formula (I) is preferably a hydrocarbyloxysilane compound having a structure represented by General Formulas (X) to (XIII) below.

(X)

(XI)

(XII)

(XIII)

In General Formulas (X) to (XIII), each of symbols U and V is integer from 0 to 2 and U+V=2. $R^{54}$ to $R^{92}$ in General Formulas (X) to (XIII) may be the same or different divalent aliphatic or alicyclic hydrocarbon group having from 1 to 20 carbons, or a divalent aromatic hydrocarbon group having from 6 to 18 carbons. In General Formula (XIII), α and β are integers from 0 to 5.

Among the compounds of General Formulas (X) to (XII), 2-((hexyl-dimethoxysilyl)methyl)-N1,N1,N3,N3-2-pentamethylpropane-1,3-diamine, N1-(3-(dimethylamino)propyl-N3,N3-dimethyl-N1-(3-(trimethoxysilyl)propyl)propane-1,3-diamine, and 4-(3-(dimethylamino)propyl)-N1,N1,N7,N7-tetramethyl-4-((trimethoxysilyl)methyl)heptane-1,7-diamine are preferred.

Among the compounds of General Formula (XIII), N,N-dimethyl-2-(3-(dimethoxymethylsilyl)propoxy)ethanamine, N,N-bis(trimethylsilyl)-2-(3-(trimethoxysilyl)propoxy) ethan amine, N,N-dimethyl-2-(3-trimethoxysilylpropoxy) ethanamine, and N,N-dimethyl-3-(3-(3-trimethoxysilyl-propoxy)ethane-1-amine are preferred.

The hydrocarbyloxysilane compound represented by General Formulas (I) to (XIII) above is preferably used as a modifier when the modified conjugated diene polymer is produced by anionic polymerization.

Also, in the present invention, the rubber composition for the tread part satisfies E' (1%, 30° C.)–E'(4%, 30° C.) 1.5 MPa, where a dynamic storage elastic modulus E' of the tread part at 30° C. and at 1% dynamic strain is E'(1%, 30° C.), and a dynamic storage elastic modulus E' of the tread part at 30° C. and at 4% dynamic strain is E'(4%, 30° C.)

In other words, this indicates that a rubber composition largely dependent on the dynamic strain for the storage elastic modulus E' is used. The rubber composition for the tread part has a sufficiently large storage elastic modulus at a low strain when the dynamic strain is 1% and thus has increased block stiffness to improve wear resistance and steering stability. On the other hand, the rubber composition for the tread part has a small storage elastic modulus at a high strain when the dynamic strain is 4% to improve wet braking performance. The rubber composition for the tread of the pneumatic tire according to the present invention is largely dependent on the dynamic strain for the storage elastic modulus, thus the relationship E'(1%, 30° C.)–E'(4%, 30° C.) indicates the characteristics, and E'(1%, 30° C.)–E'(4%, 30° C.)≥1.5 MPa is preferred.

Also, in the present invention, the rubber support layer disposed on the sidewall part has a gauge thickness from 4 to 15 mm.

The rubber support layer with increased gauge thickness enhances the stiffness of the sidewall part to improve the performance as a run-flat tire when the internal pressure is reduced, that is, run-flat resistance. In addition to originally using the rubber composition largely dependent on the dynamic strain for the storage elastic modulus as described above, the tire weight increases, and thus this increases the deformation of the tread part and accordingly increases the ground contact area during normal driving. Asa result, braking properties including a wet property are improved. Because the tread rubber composition prescribed in the present application when applied especially to a run-flat tire reduces the compression stiffness more than when applied to other tires, this enables the run-flat tire to have intended run-flat durability and an intended wet property without impairing ride comfort. However, excessive increase in the gauge thickness of the rubber support layer is as a matter of course disadvantageous in terms of fuel efficiency. Thus, with the gauge thickness of 4 mm or more, the rubber support layer can increase the braking performance while improving the run-flat performance, and with the gauge thickness of 15 mm or less, the rubber support layer can maintain the good braking and run-flat performances without excessively impairing the fuel efficiency.

[Rubber Composition]

The rubber composition according to the present invention is preferably a rubber composition formed by compounding, based on 100 parts by mass of a rubber component containing from 20 to 80% by mass of a modified conjugated diene polymer (a), from 60 to 100 parts by mass of a filler (b), from 0.9 to 2.4 parts by mass of a phenolic resin (c), from 0.07 to 0.2 parts by mass of a methylene donor (d), from 1.5 to 2.1 parts by mass of a thiuram vulcanization accelerator (e), and from 3.2 to 4.5 parts by mass of a sulfenamide vulcanization accelerator (f).

The present compounding composition can prevent a reduction in the elastic modulus of the rubber composition after vulcanization, and the vulcanized rubber composition can have high elastic modulus. This enables the side support rubber layer to have high stiffness at high temperatures, for example, such as 180° C., and at the same time to have intended flexibility at ordinary temperature, such as 25° C., satisfying ride comfort in normal driving.

(Rubber Component)

A rubber composition for the rubber support layer according to an embodiment of the present invention preferably contains from 20 to 80% by mass of the modified conjugated diene polymer (a) as a rubber component. One modified conjugated diene polymer (a) related to the rubber composition according to an embodiment of the present invention is used alone, or two or more modified conjugated diene polymers (a) are used in combination. The content of the modified conjugated diene polymer (a) being 20% by mass or more in the rubber component can improve the low heat build-up and can improve the run-flat durability. In terms of improving the low heat build-up and the run-flat durability, the content of the modified conjugated diene polymer (a) is further preferably 40% by mass or more. A polymer containing an amine-modified conjugated diene polymer, that is, a conjugated diene polymer modified with an amine, can be preferably used as the modified conjugated diene polymer (a), and the use of such a polymer can reduce the heat build-up of the resulting rubber composition and provide a tire having further improved run-flat durability.

Examples of the amine-modified conjugated diene polymer may include preferably a polymer in which a primary amino group protected with a removable group or a secondary amino group protected with a removable group is introduced as an amine functional group for modification in the molecule, and preferably a polymer in which a functional group containing a silicon atom is further introduced.

Examples of the amino group of the primary amino group protected with a removable group, which is also referred to as a protected primary amino group, may include an N,N-bis(trimethylsilyl)amino group, and examples of the secondary amino group protected with an eliminatable group may include an N,N-(trimethylsilyl)alkylamino group. The N,N-(trimethylsilyl)alkylamino group-containing group may be any one of an acyclic residue and a cyclic residue. Among the amine-modified conjugated diene polymers described above, a primary amine-modified conjugated diene polymer, which is modified with a protected primary amino group, is further suitable.

Examples of the functional group containing a silicon atom may include a hydrocarbyloxysilyl group and/or a silanol group formed by bonding a hydrocarbyloxy group and/or a hydroxy group to a silicon atom.

Such a functional group for modification needs to be present at either the polymerization initiating terminal, the side chain, or the polymerization active terminal of the conjugated diene polymer. In the present invention, the functional group is a group having an amino group protected with an removable group and one or more, for example, one or two, silicon atoms to which a hydrocarbyloxy group and a hydroxy group are included preferably at the polymerization terminal and more preferably at the same polymerization active terminal.

<Conjugated Diene Polymer>

The conjugated diene polymer used in the modification may be a conjugated diene compound homopolymer or a copolymer of two or more conjugated diene compounds or may be a copolymer of a conjugated diene compound and an aromatic vinyl compound. Examples of the conjugated diene compound include 1,3-butadiene, isoprene, 1,3-pentadiene, 2,3-dimethyl-1,3-butadiene, 2-phenyl-1,3-butadiene, and 1,3-hexadiene. One of the compounds may be used alone, or two or more of the compounds may be used in combination, but, among the compounds, 1,3-butadiene is particularly preferred.

In addition, examples of the aromatic vinyl compound used in the copolymerization with the conjugated diene compound include styrene, $\alpha$-methylstyrene, 1-vinylnaphthalene, 3-vinyltoluene, ethylvinylbenzene, divinylbenzene, 4-cyclohexylstyrene, and 2,4,6-trimethylstyrene. One of the compounds may be used alone, or two or more of the compounds may be used in combination, but, among the compounds, styrene is particularly preferred.

The conjugated diene polymer is preferably at least one conjugated diene polymer selected from a polybutadiene, a polyisoprene, an isoprene-butadiene copolymer, an ethylene-butadiene copolymer, a propylene-butadiene copolymer, and a styrene-butadiene copolymer, and particularly preferably a polybutadiene.

To allow the protected primary amine to react with the active terminal of the conjugated diene polymer to modify the conjugated diene polymer, the conjugated diene polymer is preferably a polymer in which at least 10% of the polymer chains have living nature or pseudo-living nature. Examples of a polymerization reaction having such a living nature include a reaction using an organo-alkali metal compound as an initiator and subjecting a conjugated diene compound alone or a conjugated diene compound and an aromatic vinyl compound to anionic polymerization in an organic solvent, or a reaction subjecting a conjugated diene compound alone or a conjugated diene compound and an aromatic vinyl compound to coordinated anionic polymerization in an organic solvent with a catalyst containing a lanthanide series rare earth element compound. The former reaction can provide a polymer having a high vinyl bond content in the conjugated diene moiety compared to the latter reaction and thus is preferred. The polymer having the high vinyl bond content can increase heat resistance.

The organo-alkali metal compound used as the initiator for the anionic polymerization described above is preferably an organolithium compound. The organolithium compound is not particularly limited, but a hydrocarbyllithium and a lithium amide compound are preferably used. A polymerization reaction using a hydrocarbyllithium produces a conjugated diene polymer including a hydrocarbyl group at the polymerization initiating terminal and a polymerization active site at the other terminal. In addition, a polymerization reaction using a lithium amide compound produces a conjugated diene polymer including a nitrogen-containing group at the polymerization initiating terminal and a polymerization active site at the other terminal.

The hydrocarbyllithium preferably includes a hydrocarbyl group having from 2 to 20 carbons, and examples of such a hydrocarbyllithium include ethyllithium, n-propyllithium, isopropyllithium, n-butyllithium, sec-butyllithium, tert-octyllithium, n-decllithium, phenyllithium, 2-naphthyllithium, 2-butylphenyllithium, 4-phenylbutyllithium, cyclohexyllithium, cyclopentyllithium, and a reaction product of diisopropenylbenzene and butyllithium, but among the compounds, n-butyllithium is particularly suitable.

On the other hand, examples of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium-N-methylpiperazide, lithium ethylpropylamide, lithium ethylbutylamide, lithium ethylbenzylamide, and lithium methylphenethylamide. Among the compounds, in terms of the interaction effect with a carbon black and the polymerization initiating ability, a cyclic lithium amide, such as lithium hexamethyleneimide, lithium pyrrolidide, lithium piperidide, lithium heptamethyleneimide, and lithium dodecamethyleneimide, is preferred, and in particular, lithium hexamethyleneimide and lithium pyrrolidide are suitable.

The lithium amide compounds typically prepared from a secondary amine and a lithium compound in advance can be used for polymerization, but the lithium amide compounds can also be prepared in situ in the polymerization system. In addition, the polymerization initiator is preferably used in an amount selected preferably in a range from 0.2 to 20 mmol per 100 g of a monomer.

The method for producing the conjugated diene polymer by anionic polymerization using the organolithium compound as a polymerization initiator is not particularly limited, and a well-known method in the art can be used.

Specifically, the conjugated diene compound, or the conjugated diene compound and the aromatic vinyl compound are subjected to anionic polymerization using the lithium compound as the polymerization initiator in an organic solvent inert to the reaction, for example, a hydrocarbon solvent, such as a solvent of an aliphatic, alicyclic, or aromatic hydrocarbon compound, optionally in the presence of a randomizer, and a conjugated diene polymer of interest having an active terminal is obtained.

In addition, a polymerization reaction using an organolithium compound as the polymerization initiator can more efficiently produce not only a conjugated diene polymer having an active terminal but also a copolymer having an active terminal of the conjugated diene compound and the aromatic vinyl compound, than a polymerization reaction using the catalyst containing lanthanide series rare earth element compound described above.

The hydrocarbon for the hydrocarbon solvent preferably has from 3 to 8 carbons, and examples of such a hydrocarbon may include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. One of these compounds may be used alone, or two or more of the compounds may be used in a mixture.

In addition, the monomer concentration in the solvent is preferably from 5 to 50% by mass and more preferably from 10 to 30% by mass. Furthermore, in the copolymerization using a conjugated diene compound and an aromatic vinyl compound, the content of the aromatic vinyl compound in a monomer mixture to be charged is preferably in a range of 55% by mass or less.

In addition, the randomizer used optionally is a compound having an action of controlling a microstructure of the conjugated diene polymer, for example, such as increasing the 1,2-bond of the butadiene moiety or the 3,4-bond in an isoprene polymer in a butadiene-styrene copolymer, or alternatively controlling the composition distribution of monomer units in a conjugated diene compound-aromatic vinyl compound copolymer, for example, such as randomizing the butadiene unit and the styrene unit in a butadiene-styrene copolymer. The randomizer is not particularly limited, and any of the well-known compounds commonly used as a randomizer in the art can be appropriately selected and used. Specifically, examples of such compounds may include dimethoxybenzene, tetrahydrofuran, dimethoxyethane, diethylene glycol dibutyl ether, diethylene glycol dimethyl ether; especially oxolanylpropane oligomers, such as those containing 2,2-bis(2-tetrahydrofuryl)-propane; ethers and tertiary amines, such as triethylamine, pyridine, N-methylmorpholine, N,N,N',N'-tetramethylethylenediamine, and 1,2-dipiperidinoethane. In addition, potassium salts, such as potassium tert-amylate and potassium tert-butoxide; and sodium salts, such as sodium tert-amylate; can also be used.

One of these randomizers may be used alone, or two or more of these randomizers may be used in combination. In addition, the randomizer is used in an amount selected preferably in a range of 0.01 to 1000 mol equivalents per 1 mol of a lithium compound.

The temperature in the polymerization reaction is selected in a range of preferably 0 to 150° C. and more preferably 20 to 130° C. The polymerization reaction can be carried out under the generated pressure, but it is typically desirable to operate the reaction at a pressure sufficient to keep the monomer substantially in a liquid phase. That is, although the pressure depends on the individual substance to be polymerized, the polymerization medium to be used, and the polymerization temperature, a higher pressure can be used if desired, and such a pressure is obtained by a suitable method, such as pressurizing the reactor with a gas inert to the polymerization reaction.

<Modifier>

In the present invention, a primary amine-modified conjugated diene polymer can be produced by allowing a protected primary amine compound to react with the active terminal of the conjugated diene polymer obtained as described above, and a secondary amine-modified conjugated diene polymer can be produced by allowing a protected secondary amine compound to react. The protected primary amine compound is suitably an alkoxysilane compound including a protected primary amino group, and the protected secondary amine compound is suitably an alkoxysilane compound including a protected secondary amino group.

Examples of the alkoxysilane compound including a protected primary amino group used as the modifier may include N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, and N,N-bis(trimethylsilyl)aminoethylmethyldiethoxysilane, and preferably N,N-bis(trimethylsilyl)aminopropylmethyldimethoxysilane, N,N-bis(trimethylsilyl)aminopropylmethyldiethoxysilane, or 1-trimethylsilyl-2,2-dimethoxy-1-aza-2-silacyclopentane.

In addition, examples of the modifier also include alkoxysilane compounds including a protected secondary amino group, such as N-methyl-N-trimethylsilylaminopropyl(methyl)dimethoxysilane, N-methyl-N-trimethylsilylaminopropyl(methyl)diethoxysilane, N-trimethylsilyl(hexamethyleneimine-2-yl)propyl(methyl)-dimethoxysilane, N-trimethylsilyl(hexamethyleneimine-2-yl)propyl(methyl)-diethoxysilane, N-trimethylsilyl(pyrrolidine-2-yl)propyl(methyl)dimethoxysilane, N-trimethylsilyl(pyrrolidine-2-yl)propyl(methyl)diethoxysilane, N-trimethylsilyl(piperidine-2-yl) propyl(methyl)dimethoxysilane, N-trimethylsilyl(piperidine-2-yl)propyl(methyl)diethoxysilane, N-trimethylsilyl(imidazole-2-yl)propyl(methyl)dimethoxysilane, N-trimethylsilyl(imidazole-2-yl)propyl(methyl)diethoxysilane, N-trimethylsilyl(4,5-dihydroimidazole-5-yl)propyl(methyl)-dimethoxysilane, and N-trimethylsilyl(4,5-dihydroimidazole-5-yl)propyl(methyl)-diethoxysilane; alkoxysilane compounds including an imino group, such as N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N, N-dimethylaminobenzylidene)-3-(triethoxysilyl)-1-pro panamine, and N-(cyclohexylidene)-3-(triethoxysilyl)-1-propanamine; and alkoxysilane compounds including an amino group, such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, and 3-dibutylaminopropyl(triethoxy)silane.

One of these modifiers may be used alone, or two or more of these modifiers may be used in combination. In addition, the modifier may be a partial condensate.

Here, a "partial condensate" refers to a modifier in which not all but some of Si—OR bonds of the modifier are bonded together to form an Si—O—Si bond by condensation.

In the modification reaction with the modifier, the modifier is used in an amount preferably from 0.5 to 200 mmol/kg·conjugated diene polymer. The modifier is used in an amount more preferably from 1 to 100 mmol/kg·conjugated diene polymer and particularly preferably from 2 to 50 mmol/kg·conjugated diene polymer. Here, the "conjugated diene polymer" refers to the mass of only the polymer excluding an additive, such as an antioxidant, added during or after the production. The modifier used in an amount in the above range allows the reinforcing filler, particularly a carbon black, to have excellent dispersibility and improves the fracture resistance and the low heat build-up after vulcanization.

In addition, the method of adding the modifier is not particularly limited, and examples of the method include a method of adding the entire amount at once, a method of dividedly adding, or a method of continuously adding, but a method of adding the entire amount at once is preferred.

Also, the modifier can be bonded to either the polymer main chain or the side chain in addition to the polymerization initiating terminal or the polymerization ending terminal but preferably introduced at the polymerization initiating terminal or at the polymerization ending terminal in terms of being able to prevent energy loss from the polymer terminal and improve the low heat build-up.

<Condensation Accelerator>

In the present invention, a condensation accelerator is preferably used to accelerate the condensation reaction involving the alkoxysilane compound including a protected primary amino group used as the modifier described above.

Such a condensation accelerator that can be used includes a compound containing a tertiary amino group or an organic compound containing one or more elements belonging to any of group 3, group 4, group 5, group 12, group 13, group 14, and group 15 of the periodic table (long periodic table). Furthermore, the condensation accelerator is preferably an alkoxide, a carboxylate salt, or an acetylacetonate complex salt containing at least one or more metals selected from the group consisting of titanium: Ti, zirconium: Zr, bismuth: Bi, aluminum: Al, and tin: Sn.

The condensation accelerator used here may be added before the modification reaction but is preferably added to the modification reaction system during and/or after the modification reaction. If the condensation accelerator is added before the modification reaction, a direct reaction with the active terminal would occur, and the hydrocarbyloxy group including a protected primary amino group at the active terminal would not be introduced.

The period for addition of the condensation accelerator is typically from 5 minutes to 5 hours after the start of the modification reaction and preferably from 15 minutes to 1 hour after the start of the modification reaction.

Specifically, examples of the condensation accelerator may include compounds containing titanium, such as tetramethoxytitanium, tetraethoxytitanium, tetra-n-propoxytitanium, tetraisopropoxytitanium, tetra-n-butoxytitanium, tetra-n-butoxytitanium oligomer, tetra-sec-butoxytitanium, tetra-tert-butoxytitanium, tetra(2-ethylhexyl) titanium, bis(octanediolate)bis(2-ethylhexyl)titanium, tetra (octanediolate)titanium, titanium lactate, titanium dipropoxy bis(triethanolaminate), titanium dibutoxy bis(triethanolaminate), titanium tributoxystearate, titanium tripropoxystearate, titanium ethylhexyldiolate, titanium tripropoxyacetylacetonate, titanium dipropoxy bis(acetylacetonate), titanium tripropoxyethylacetoacetate, titanium propoxyacetylacetonate bis(ethylacetoacetate), titanium tributoxyacetylacetonate, titanium dibutoxy bis(acetylacetonate), titanium tributoxyethylacetoacetate, titanium butoxyacetylacetonate bis(ethylacetoacetate), titanium tetrakis (acetylacetonate), titanium diacetylacetonate bis (ethylacetoacetate), bis(2-ethylhexanoate)titanium oxide, bis(laurate)titanium oxide, bis(naphthenate)titanium oxide, bis(stearate)titanium oxide, bis(oleate)titanium oxide, bis (linoleate)titanium oxide, tetrakis(2-ethylhexanoate)titanium, tetrakis(laurate)titanium, tetrakis(naphthenate)titanium, tetrakis(stearate)titanium, tetrakis(oleate)titanium, and tetrakis(linoleate)titanium.

In addition, examples of the condensation accelerator may include tris(2-ethylhexanoate)bismuth, tris(laurate)bismuth, tris(naphthenate)bismuth, tris(stearate)bismuth, tris(oleate) bismuth, tris(linoleate)bismuth, tetraethoxyzirconium, tetra-n-propoxyzirconium, tetraisopropoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxy bis(acetylacetonate), zirconium tributoxyethylacetoacetate, zirconium butoxyacetylacetonate bis (ethylacetoacetate), zirconium tetrakis(acetylacetonate), zirconium diacetylacetonate bis(ethylacetoacetate), bis(2-ethylhexanoate)zirconium oxide, bis(laurate)zirconium oxide, bis(naphthenate)zirconium oxide, bis(stearate)zirconium oxide, bis(oleate)zirconium oxide, bis(linoleate)zirconium oxide, tetrakis(2-ethylhexanoate)zirconium, tetrakis (laurate)zirconium, tetrakis(naphthenate)zirconium, tetrakis (stearate)zirconium, tetrakis(oleate)zirconium, and tetrakis (linoleate)zirconium.

Furthermore, examples of the condensation accelerator may include triethoxyaluminum, tri-n-propoxyaluminum, triisopropoxyaluminum, tri-n-butoxyaluminum, tri-sec-butoxyaluminum, tri-tert-butoxyaluminum, tri(2-1ethylhexyl) aluminum, aluminum dibutoxystearate, aluminum dibutoxy acetylacetonate, aluminum butoxy bis(acetylacetonate), aluminum dibutoxyethylacetoacetate, aluminum tris(acetylacetonate), aluminum tris(ethylacetoacetate), tris(2-ethylhexanoate)aluminum, tris(laurate)aluminum, tris (naphthenate)aluminum, tris(stearate)aluminum, tris(oleate) aluminum, and tris(linoleate)aluminum.

Among the condensation accelerators described above, titanium compounds are preferred, and titanium alkoxides, titanium carboxylates, or titanium acetylacetonate complex salts are particularly preferred.

The condensation accelerator is used in a molar ratio preferably from 0.1 to 10 and particularly preferably from 0.5 to 5, based on the total amount of hydrocarbyloxy groups present in the reaction system. The condensation accelerator used in the above range allows the condensation reaction to efficiently proceed.

In addition, the condensation reaction time is typically approximately from 5 minutes to 10 hours and preferably approximately from 15 minutes to 5 hours. The condensation reaction time in the above range allows the condensation reaction to be smoothly completed.

In addition, the pressure of the reaction system during the condensation reaction is typically from 0.01 to 20 MPa and preferably from 0.05 to 10 MPa.

<Modified Conjugated Diene Polymer (a)>

The modified conjugated diene polymer (a) thus obtained has a Mooney viscosity: $ML_{1+4}$ at 100° C. preferably from 10 to 150 and more preferably from 15 to 100. The Mooney viscosity less than 10 would fail to provide sufficient rubber physical properties including fracture resistance, and the Mooney viscosity more than 150 would deteriorate workability, resulting in difficulty in kneading with other components.

In addition, the unvulcanized rubber composition for the rubber support layer according to the present invention, the unvulcanized composition compounding the modified conjugated diene polymer (a) has a Mooney viscosity: $ML_{1+4}$ at 130° C. preferably from 10 to 150 and more preferably from 30 to 100.

The modified conjugated diene polymer (a) used in the rubber composition according to an embodiment of the present invention has a ratio Mw/Mn of the weight average molecular weight: Mw and the number average molecular weight:Mn, that is, the molecular weight distribution: Mw/Mn preferably from 1 to 3 and more preferably from 1.1 to 2.7.

The molecular weight distribution: Mw/Mn of the modified conjugated diene polymer (a) in the above range does not reduce the workability of the rubber composition compounding the modified conjugated diene polymer, facilitates the kneading and can sufficiently improve the properties of the rubber composition.

In addition, the modified conjugated diene polymer (a) used in the rubber composition for the rubber support layer according to the present invention has a number average molecular weight:Mn preferably from 100,000 to 500,000 and more preferably from 150,000 to 300,000. The modified conjugated diene polymer (a) having the number average molecular weight in the above range prevents the reduction in the elastic modulus of the vulcanized material and the increase in the hysteresis loss and provides excellent fracture resistance; and also provides excellent kneading workability to the rubber composition containing the modified conjugated diene polymer (a).

The modified conjugated diene polymer (a) used in the rubber composition according to the present invention is preferably an amine-modified polybutadiene, more preferably an amine-modified polybutadiene modified with a primary amine or an amine-modified polybutadiene modified with a secondary amine, and particularly preferably a primary amine-modified polybutadiene in terms of improving the low heat build-up.

The modified conjugated diene polymer (a) according to the present invention has a vinyl bond content in the butadiene moiety preferably from 10 to 60% by mass and more preferably from 12 to 60% by mass, Mw preferably from 100,000 to 500,000, Mw/Mn preferably from 2 or less, and a primary amino group content preferably from 2.0 to 10.0 mmol/kg.

<Additional Rubber Component>

Examples of an additional rubber component used optionally in combination with the modified conjugated diene polymer (a) in the rubber component according to the present invention includes one or more diene rubbers selected from natural rubber and diene synthetic rubbers other than the modified conjugated diene polymer (a). The rubber component contains preferably from 80 to 0% by mass of the additional rubber component for the remainder of 20 to 100% by mass of the modified conjugated diene polymer (a) in the rubber component. Furthermore, the rubber component contains more preferably from 65 to 0% by mass of the additional rubber component for the remainder of 35 to 100% by mass of the modified conjugated diene polymer (a) in the rubber component and contains still more preferably from 60 to 0% by mass of the additional rubber component for the remainder of 40 to 100% by mass of the modified conjugated diene polymer (a) in the rubber component. Examples of the diene synthetic rubber described above include styrene-butadiene copolymers: SBR, polybutadienes: BR, polyisoprenes: IR, styrene-isoprene copolymers: SIR, ethylene-butadiene copolymers: EBR, propylene-butadiene copolymers: PBR, butyl rubbers: IIR, halogenated butyl rubber, ethylene-propylene-diene terpolymers: EPDM, and mixtures of these compounds. In addition, some or all of the additional diene synthetic rubbers are more preferably diene modified rubbers having a branched structure formed by using a polyfunctional modifier, for example, a modifier, such as tin tetrachloride.

<Filler (b)>

The rubber composition for the rubber support layer according to the present invention preferably contains from 60 to 100 parts by mass of a filler as the component (b) based on 100 parts by mass of the rubber component. The content of the filler (b) of 60 parts by mass or more will provide the resulting rubber composition with vulcanized rubber properties including exhibiting sufficient reinforcing effect. In addition, the content of the filler (b) of 100 parts by mass or less will provide the resulting rubber composition with vulcanized rubber properties including a tangent loss tan 5 that is not too high, for example, at 25° C., improved fuel efficiency, in other words, an improved low heat build-up, during normal driving, and reduced rolling resistance.

In an embodiment of the present invention, the filler (b) is preferably at least one selected from a carbon black and silica. The filler (b) contains more preferably 50% by mass or more of a carbon black and 50% by mass or less of silica, and the filler (b) particularly preferably contains a carbon black alone. To allow the vulcanized rubber physical properties of the resulting rubber composition to satisfy the vulcanized rubber physical properties described above, at least one carbon black selected from among FEF grade, FF grade, HAF grade, N339, IISAF grade, ISAF grade, and SAF grade is preferably used in the rubber composition for the rubber support layer according to an embodiment of the present invention, and FEF grade is particularly suitable.

The silica is not particularly limited, but is preferably wet silica, dry silica, or colloidal and particularly preferably wet silica. One type of silica can be used alone, or two or more types of silica can be used in a mixture.

<Thermosetting Resin (c)>

In the rubber support layer according to an embodiment of the present invention, a thermosetting resin (c) is used. Examples of the thermosetting resin may include melamine resins: e.g., melamine-formaldehyde resins, urea resins: e.g., urea-formaldehyde resins, polycarbonate resins, phenolic thermosetting resins, epoxy resins, unsaturated polyester resins, acrylic resins, guanamine resins, and polyurethane resins; and in addition, a resin having a hardness comparable to that of these resins can also be used.

Examples of the thermosetting resin (c) used in the present invention include novolac phenolic resins, novolac cresol resins, novolac xylenol resins, novolac resorcinol resins, and phenolic thermosetting resins formed by oil-modifying the above resin; and at least one of these resins is suitably used.

Examples of the oil used in the oil modification of the phenolic resin include rosin oil, tall oil, cashew oil, linoleic oil, oleic acid, and linoleic acid. At least one of these oils is suitably used, but in terms of providing both run-flat durability and ride comfort, the phenolic resin is preferably cashew oil-modified.

The compounded amount of the above thermosetting resin is from 0.9 to 2.4 parts by mass based on 100 parts by mass of the rubber component. The compounded amount of the thermosetting resin of 0.9 parts by mass or greater enables the vulcanized rubber composition to have higher elastic modulus and can improve workability of the unvulcanized rubber composition. On the other hand, the compounded amount of the thermosetting resin of 2.4 parts by mass or less can prevent impairment of flexibility of the vulcanized rubber composition.

In the rubber composition for the rubber support layer according to an embodiment of the present invention, the compounded amounts (parts by mass) of the filler (b) and the thermosetting resin (c) preferably satisfy the following relationship:

$$1.0 \leq [\text{mass ratio}\{\text{compounded amount of thermosetting resin } (c)/\text{compounded amount of filler}(b)\}] \times 100 \leq 4.0 \quad \text{(XIV)}.$$

When [mass ratio {compounded amount of thermosetting resin (c)/compounded amount of filler (b)}]×100 is 1.0 or greater, the rubber composition has relatively high elastic modulus at high temperatures, for example, such as 180° C., compared to the elastic modulus at ordinary temperature of around 25° C. This improves the run-flat durability and thus is preferred. When [mass ratio {compounded amount of thermosetting resin (c)/compounded amount of filler (b)}]×100 is 4.0 or less, the rubber composition is more likely to have intended flexibility at ordinary temperature of around 25° C., and thus this is preferred.

<Methylene Donor (d)>

The methylene donor (d) used in the present invention is used as a curing agent for the thermosetting resin (c), and, for example, at least one selected from hexamethylenetetramine, hexamethoxymethylmelamine, paraformaldehyde, acetaldehyde ammonia, α-polyoxymethylene, a polymethylol melamine derivative, an oxazolidine derivative, and polymethylolated acetylene-urea is preferably used. Among the compounds, at least one selected from hexamethylenetetramine and hexamethoxymethylmelamine is still more preferred in terms of having rapid curing rate and providing a rubber composition having higher elasticity.

The above methylene donor (d) is compounded in an amount of 0.07 to 0.2 parts by mass based on 100 parts by mass of the rubber component. The compounded amount of the methylene donor in the above range allows the thermosetting resin to cure as intended and causes no adverse effect on the crosslinking system of the rubber. Furthermore, the methylene donor is compounded in an amount preferably from 0.08 to 0.18 parts by mass in terms of providing both run-flat durability and ride comfort. From the perspective, the methylene donor (d) is compounded in an amount preferably from 3 to 80 parts by mass, more preferably from 5 to 80 parts by mass, still more preferably from 5 to 50 parts by mass, and even more preferably from 5 to 30 parts by mass, and particularly preferably from 5 to 20 parts by mass, based on 100 parts by mass of the thermosetting resin (c).

<Thiuram Vulcanization Accelerator (e) and Sulfenamide Vulcanization Accelerator (f)>

Use of the thiuram vulcanization accelerator (e) and the sulfenamide vulcanization accelerator (f) in combination as vulcanization accelerators is important for the rubber composition for the rubber support layer according to the present invention. Use of the thiuram vulcanization accelerator (e) and the sulfenamide vulcanization accelerator (f) in combination further increases the elastic modulus of the vulcanized rubber composition at high temperature, for example, such as 180° C., and can further improve the low heat build-up of the vulcanized rubber composition, that is, fuel efficiency. The rubber composition with the increased elastic modulus at high temperatures can prevent deflection of the sidewall of the tire, when applied to the side support rubber of the tire. In addition, the rubber composition, when applied to the side support rubber of the tire, improves the low heat build-up and thus prevents heat generation from the tire during run-flat traveling, and reduces rolling resistance during normal driving.

From the above perspective, the compounded amounts in parts by mass of the thiuram vulcanization accelerator (e) and the sulfenamide vulcanization accelerator (f) preferably satisfy the following relationship:

0.45 mass ratio[compounded amount of thiuram vulcanization accelerator(e)/compounded amount of sulfenamide vulcanization accelerator(f)]≤0.65  (XV)

When [compounded amount of thiuram vulcanization accelerator (e)/compounded amount of sulfenamide vulcanization accelerator (f)] is 0.45 or greater, the rubber composition has relatively high elastic modulus at high temperatures, for example, such as 180° C., compared to the elastic modulus at ambient temperature of around 25° C. This improves the run-flat durability and thus is preferred. When [content of thiuram vulcanization accelerator (e)/content of sulfenamide vulcanization accelerator (f)] is 0.65 or less, rubber scorch is less likely to occur in the processing of the unvulcanized rubber. This improves workability of the unvulcanized rubber and thus is preferred.

<Thiuram Vulcanization Accelerator (e)>

The rubber composition for the rubber support layer according to an embodiment of the present invention compounds from 1.5 to 2.1 parts by mass of the thiuram vulcanization accelerator (e) based on 100 parts by mass of the rubber component. The compounded amount of the thiuram vulcanization accelerator (e) in the above range can enhance effect of the combination use with the sulfenamide vulcanization accelerator (f).

Examples of the thiuram vulcanization accelerator (e) according to the present invention include tetrakis(2-ethylhexyl) thiuram disulfide, tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monosulfide, tetranonylthiuram monosulfide, tetradecylthiuram monosulfide, tetradodecylthiuram monosulfide, tetrastearylthiuram monosulfide, tetrabenzylthiuram monosulfide, and dipentamethylenethiuram tetrasulfide. Among the thiuram vulcanization accelerators, tetrakis(2-ethylhexyl)thiuram disulfide and tetrabenzylthiuram disulfide are easy to adjust the vulcanization rate and thus are preferred.

<Sulfenamide Vulcanization Accelerator (f)>

The rubber composition for the rubber support layer according to the present invention compounds from 3.2 to 4.5 parts by mass of the sulfenamide vulcanization accelerator (f) based on 100 parts by mass of the rubber component. The compounded amount of the sulfenamide vulcanization accelerator (f) in the above range can enhance effect of the combination use with the thiuram vulcanization accelerator (e).

The increased compounded amounts of the thiuram vulcanization accelerator (e) and the sulfenamide vulcanization accelerator (f) as described above as the vulcanization accelerators according to the present invention further increases the elastic modulus of the vulcanized rubber composition at high temperature, for example, such as 180° C., and can further improve the low heat build-up of the vulcanized rubber composition, that is, fuel efficiency.

Examples of the sulfenamide vulcanization accelerator (f) according to the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-dipentyl-2-benzothiazolylsulfenamide, N,N-dioctyl-2-benzothiazolylsulfenamide, N,N-di-2-ethylhexylbenzothiazolylsulfenamide, N-decyl-2-benzothiazolylsulfenamide, N,N-didodecyl-2-benzothiazolylsulfenamide, and N,N-distearyl-2-benzothiazolylsulfenamide. Among the compounds, N-cyclohexyl-2-benzothiazolylsulfenamide, N-tert-butyl-2-benzothiazolylsulfenamide, and N,N-dicyclohexyl-2-benzothiazolylsulfenamide are easy to adjust the vulcanization rate and thus are preferred.

<Vulcanizing Agent>

Examples of a vulcanizing agent according to the present invention preferably include one or more sulfur-containing vulcanizing agents selected from sulfur and sulfur donors, and the compounded amount of the vulcanizing agent is preferably from 1.0 to 10.0 parts by mass as sulfur content, more preferably from 2.0 to 10.0 parts by mass as sulfur content, and particularly preferably from 2.0 to 8.0 parts by mass as sulfur content, based on 100 parts by mass of the rubber component. The sulfur content of 1.0 parts by mass or more can improve the fracture strength, the wear resistance, and the low heat build-up of the vulcanized rubber composition, and the sulfur content of 10.0 parts by mass or less enables the rubber composition to have intended rubber elasticity.

The rubber composition for the rubber support layer according to the present invention can contain, in addition to the rubber component described above, various components commonly used in the rubber industry. Examples of the various components may include additives such as antioxidants; zinc oxide; stearic acid; softeners; and antiozonants.

The rubber composition for the tread part or the rubber support layer according to the present invention can be produced by kneading each component described above using an apparatus, for example, a Banbury mixer or a kneader, and after molding and vulcanization, the rubber composition can be suitably used as the tread part or the rubber support layer of the tire.

Figure 1:
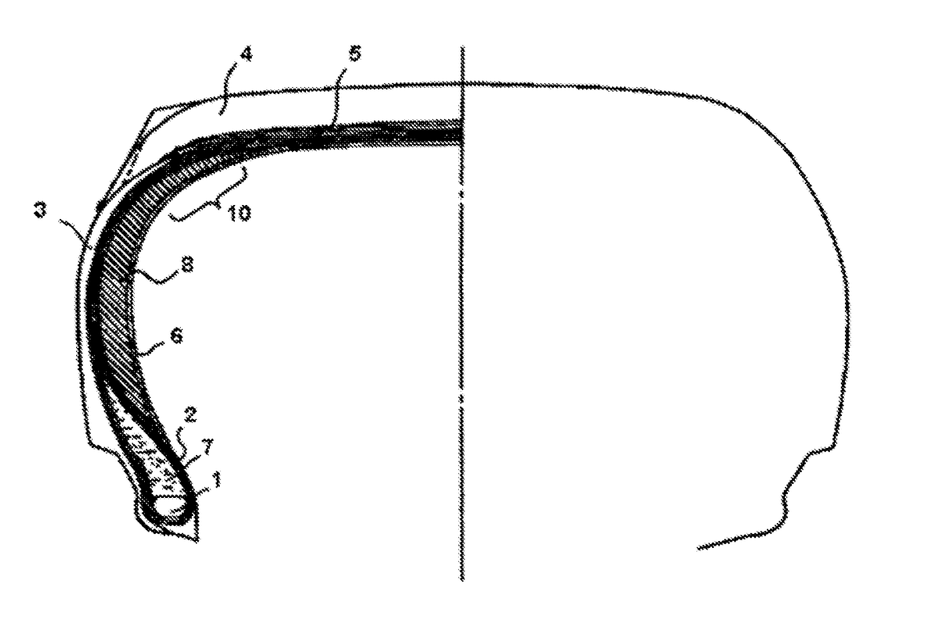

The pneumatic tire according to the present invention will be described below with reference to FIG. 1. FIG. 1 is a schematic view illustrating a cross section of an embodiment of the pneumatic tire according to the present invention.

In FIG. 1, a preferred embodiment of the pneumatic tire according to the present invention includes a pair of bead cores 1 and 1'. Note that 1' is not illustrated. A carcass layer 2 formed of at least one radial carcass ply extends in a toroidal shape across the pair of bead cores 1 and 1', and both end parts of the carcass layer 2 are wound up from the inner side of the tire to the outer side of the tire around the bead core 1. A sidewall part 3 is disposed on the outer side in the tire axial direction of the side region of the carcass layer 2 and forms an outer side part. A tread rubber layer 4 is disposed on the outer side in the tire radial direction of the crown region of the carcass layer 2 to form a ground contact part. A belt layer 5 is disposed between the tread rubber layer 4 and the crown region of the carcass layer 2 to form a support belt. An inner liner 6 is disposed on the carcass layer 2 across the entire inner surface of the tire to form an air-sealed membrane. A bead filler 7 is disposed between a body part of the carcass layer 2 extending from the one bead core 1 to the other bead core 1' and a wound part wound by the bead core 1. At least one side support layer 8 having a substantially crescent cross-sectional shape along the tire rotation axis is disposed between the carcass layer 2 and the inner liner 6, from the side part of the bead filler 7 of the side region of the carcass layer to a shoulder region 10.

EXAMPLES

Next, the embodiments according to the present invention will be described in further detail with reference to examples and comparative examples, but the present invention is not limited to examples thereof.

Production Example 1: Production of Terminal Modified Styrene-Butadiene Copolymer Rubber To a 800 mL pressure-resistant glass container dried and purged with nitrogen, a solution of 1,3-butadiene in cyclohexane and a solution of styrene in cyclohexane are added to contain 67.5 g of 1,3-butadiene and 7.5 g of styrene. Then 0.6 mmol of 2,2-ditetrahydrofurylpropane and 0.8 mmol of n-butyllithium are added, and then polymerization is carried out at 50° C. for 1.5 hours. To the polymerization reaction system in which the polymerization conversion ratio reaches approximately 100%, 0.72 mmol of N,N-bis(trimethylsilyl) aminopropylmethyldiethoxysilane is added as a modifier, and a modification reaction is carried out at 50° C. for 30 minutes. Thereafter, 2 mL of a 5% by mass solution of 2,6-di-t-butyl-p-cresol (BHT) in 2-propanol is added, and the reaction is quenched. The resulting product is dried according to an ordinary method, and a modified SBR is obtained.

Production Example 2: Method for Producing Modified Conjugated Diene Polymer (a)

(1) Production of Unmodified Polybutadiene

To a 5 L autoclave purged with nitrogen, 1.4 kg of cyclohexane and 250 g of 1,3-butadiene are injected as a solution in 2,2-ditetrahydrofurylpropane (0.285 mmol) under nitrogen. To this mixture, 2.85 mmol of n-butyllithium (BuLi) is added, and then polymerization is carried out in a warm water bath equipped with a stirring device at 50° C. for 4.5 hours. The reaction conversion ratio of 1,3-butadiene is approximately 100%. A portion of the polymer solution is extracted out into a methanol solution containing 1.3 g of 2,6-di-tert-butyl-p-cresol, and the polymerization is quenched. Then the mixture is desolventized by steam stripping and dried with a roll at 110° C., and an unmodified polybutadiene is obtained.

(2) Production of Primary Amine-Modified Polybutadiene (a)

The polymer solution obtained in (1) above is maintained at a temperature of 50° C. without deactivating the polymerization catalyst, 1129 mg (3.364 mmol) of N,N-bis(trimethylsilyl)aminopropylmethyldiethoxysilane, in which the primary amino group is protected, is added, and a modification reaction is carried out for 15 minutes. Thereafter, 8.11 g of tetrakis(2-ethyl-1,3-hexanediolato) titanium, which is a condensation accelerator, is added, and the mixture is further stirred for 15 minutes. Finally, 242 mg of silicon tetrachloride is added as a metal halide to the polymer solution after the reaction, and 2,6-di-tert-butyl-p-cresol is added. Then, desolventization and deprotection of the protected primary amino group is carried out by steam stripping. The rubber is dried with a temperature-controlled roll at 110° C., and a primary amine-modified polybutadiene is obtained.

[Measurement of E']

According to the compositions shown in Table 1, a tread rubber composition is compounded and kneaded, and each rubber composition is vulcanized at 145° C. for 33 minutes. The resulting vulcanized rubber is measured for storage elastic modulus at 1% strain at 30° C. and storage elastic modulus at 4% strain at 30° C. under conditions of an initial load of 160 mg and a frequency of 52 Hz using a spectrometer manufactured by Ueshima Seisakusho, Co., Ltd.

[Production of Tire]

A rubber composition for a tread and a rubber composition for a rubber support layer compounded according to the compositions shown in Table 1 are used as rubber compositions of Examples and Comparative Examples, and radial tires of 225/45R17 for passenger cars are produced according to an established method. The tires are evaluated for run-flat durability, wet grip performance, and rolling resistance.

A test tire, which is a passenger car radial tire having a tire size of 225/45R17, is mounted on a rim at normal pressure. The tire is charged with an internal pressure of 230 kPa and then allowed to stand in a room at 38° C. for 24 hours. Thereafter, the core of the valve is removed, and the internal pressure is returned to atmospheric pressure. A drum running test is carried out under conditions: loads of 4.17 kN and 425 kg, a speed at 89 km/h, and an indoor temperature at 38° C. A predicted result of the travel distance until the occurrence of failure of each test tire is expressed as an index value according to an equation below for Example 1 and Comparative Examples 1 to 3 with the travel distance of Comparative Example 1 being defined as 100. The larger the index value, the better the run-flat durability is.

Run-flat durability index=(running distance of test tire/travel distance of tire of Comparative Example 1)×100

[Evaluation of Wet Grip Performance]

The test tire obtained as described above is mounted on a test vehicle, and steering stability on a wet road surface is evaluated predictively. Index values are expressed with the value from Comparative Example 1 being defined as 100. The larger the value, the superior the wet property is.

TABLE 1

|  | Comparative Example | | | |
|---|---|---|---|---|
|  | 1 | 2 | 3 | 4 |
| Tread part: composition/phr | | | | |
| Natural rubber *1 |  | 70 |  | 70 |
| Terminal modified SBR *2 |  | 30 |  | 30 |
| SBR *3 | 100 |  | 100 |  |
| $C_5$-$C_9$ resin *4 |  | 15 |  |  |
| $C_9$ resin *5 |  |  |  | 15 |
| Carbon black *6 | 5 | 5 | 5 | 5 |
| Silica *7 | 63 | 60 | 63 | 60 |
| Anti-oxidant *8 | 3 | 3 | 3 | 3 |
| Zinc oxide | 2.5 | 2.5 | 2.5 | 2.5 |
| Stearic acid | 1 | 1 | 1 | 1 |
| Vulcanization accelerator *9 | 1.2 | 1.2 | 1.2 | 1.2 |
| Sulfur | 1.5 | 1.5 | 1.5 | 1.5 |
| Tread part: physical property | | | | |
| E'(1%, 30° C.)/MPa | 7.9 | 7.4 | 7.9 | 8.0 |
| E'(4%, 30° C.)/MPa | 6.5 | 5.8 | 6.5 | 5.4 |
| E'(1%, 30° C.) − E'(4%, 30° C.)/MPa | 1.4 | 1.6 | 1.4 | 2.6 |
| Rubber support layer: composition/phr | | | | |
| Natural rubber *10 |  |  | 30 | 30 |
| Modified conjugated diene polymer *11 |  |  | 70 | 70 |
| Carbon black*12 |  |  | 60 | 60 |
| Phenol resin *13 |  |  | 1.2 | 1.2 |
| Hexamethylenetetramine*14 |  |  | 0.12 | 0.12 |
| Thiuram Vulcanization accelerator *15 |  |  | 1.8 | 1.8 |
| Sulfenamide Vulcanization accelerator *16 |  |  | 3.3 | 3.3 |
| Anti-oxidant *8 |  |  | 1 | 1 |
| Sulfur |  |  | 5.5 | 5.5 |
| Rubber support layer: E's/MPa | | | | |
| Rubber support layer: gauge thickness/mm | 0 | 0 | 4 | 20 |
| Evaluation | | | | |
| Run-flat resistance | 100 | 100 | 130 | 139 |
| Wet property | 100 | 105 | 90 | 88 |

TABLE 2

|  | Example | | | | | |
|---|---|---|---|---|---|---|
|  | 1 | 2 | 3 | 4 | 5 | 6 |
| Tread part: composition/phr | | | | | | |
| Natural rubber | 70 | 50 | 70 | 90 | 70 | 70 |
| Terminal modified SBR SBR | 30 | 50 | 30 | 10 | 30 | 30 |
| SBR | | | | | | |
| $C_5$-$C_9$ resin | 15 | 15 |  |  |  | 15 |
| $C_9$ resin |  |  | 15 | 15 | 15 |  |
| Carbon black | 5 | 5 | 5 | 5 | 25 | 5 |
| Silica | 60 | 60 | 60 | 60 | 40 | 60 |
| Anti-oxidant | 3 | 3 | 3 | 3 | 3 | 3 |
| Zinc oxide | 2.5 | 2.5 | 2.5 | 2.5 | 2.5 | 2.5 |
| Stearic acid | 1 | 1 | 1 | 1 | 1 | 1 |
| Vulcanization accelerator | 1.2 | 1.2 | 1.2 | 1.2 | 1.2 | 1.2 |
| Sulfur | 1.5 | 1.5 | 1.5 | 1.5 | 1.5 | 1.5 |
| Tread part: physical property | | | | | | |
| E'(1%, 30° C.)/MPa | 7.4 | 7.2 | 8.0 | 7.8 | 8.4 | 7.4 |
| E'(4%, 30° C.)/MPa | 5.8 | 5.3 | 5.4 | 5.8 | 6.7 | 5.8 |
| E'(1%, 30° C.) − E'(4%, 30° C.)/MPa | 1.6 | 1.9 | 2.6 | 2.0 | 1.7 | 1.6 |
| Rubber support layer: composition/phr | | | | | | |
| Natural rubber | 30 | 30 | 30 | 30 | 30 | 30 |
| Modified conjugated diene polymer | 70 | 70 | 70 | 70 | 70 | 70 |
| Carbon black | 60 | 60 | 60 | 60 | 60 | 40 |
| Phenol resin | 1.2 | 1.2 | 1.2 | 1.2 | 1.2 | 1.2 |
| Hexamethylenetetramine | 0.12 | 0.12 | 0.12 | 0.12 | 0.12 | 0.12 |
| Thiuram Vulcanization accelerator | 1.8 | 1.8 | 1.8 | 1.8 | 1.8 | 1.8 |
| Sulfenamide Vulcanization accelerator | 3.3 | 3.3 | 3.3 | 3.3 | 3.3 | 3.3 |
| Anti-oxidant*8 | 1 | 1 | 1 | 1 | 1 | 1 |
| Sulfur | 5.5 | 5.5 | 5.5 | 5.5 | 5.5 | 5.5 |
| Rubber support layer: E's/MPa | | | | | | |
| Rubber support layer: gauge thickness/mm | 4 | 4 | 4 | 4 | 4 | 4 |
| Evaluation | | | | | | |
| Run-flat resistance | 130 | 125 | 128 | 133 | 122 | 115 |
| Wet property | 100 | 103 | 100 | 99 | 101 | 100 |

In Tables 1 and 2, phr represents parts by weight, and the total amount of rubber components is defined as 100 phr.

1: Natural rubber RSS #3
2: Produced by the method of Production Example 1 described above
3: #1500manufactured by JSR Corporation
4: $C_5$-$C_9$ resin, T-REZ RD104, manufactured by Tonen Chemical Corporation
5: $C_9$ resin, Neopolymer 140, manufactured by Nippon Petrochemicals Co., Ltd.
6: ISAF, N330, Vulcan 3, manufactured by Cabot Corporation
7: Nipsil AQ, BET specific surface area of 205 $m^2/g$, manufactured by Tosoh Silica Corporation
8: 6 PPD, N-(1,3-dimethylbutyl)-N'-phenyl-p-phenylenediamine, Nocrac 6C, manufactured by Ouchi Shinko Chemical Industrial Co., Ltd.
9: Vulcanization accelerator DPG, Nocceler D, manufactured by Ouchi Shinko Chemical Industrial Co., Ltd.
10: Natural rubber RSS #1
11: Produced by the method of Production Example 2, (2) described above
12: FEF, N550, Asahi #60, manufactured by Asahi Carbon Co., Ltd.

13: Cashew-modified phenolic resin, Sumilite Resin PR-BSN-21, manufactured by Sumitomo Bakelite Co., Ltd.

14: Manufactured by Wako Pure Chemical Industries, Ltd.

15: TOT, tetrakis(2-ethylhexyl)thiuram disulfide, Nocceler TOT-N, manufactured by Ouchi Shinko Chemical Industrial Co., Ltd.

16: NS, N-(tert-butyl)-2-benzothiazolylsulfenamide, Sanceler NS-G, manufactured by Sanshin Chemical Industry Co., Ltd.

Examples 1 to 6 demonstrate excellent balance between improved run-flat durability and a wet property. Among Comparative Examples 1 to 4, Comparative Examples 1 and 2, which include no rubber support layer, demonstrate no improvement in run-flat durability. Comparative Examples 3 and 4, which include a rubber support layer, improve run-flat durability but reduce a wet property.

INDUSTRIAL APPLICABILITY

Use of the present invention provides a pneumatic tire having both a wet property and run-flat durability.

LETTERS AND NUMERALS

1 Bead core
2 Carcass layer
3 Sidewall part
4 Tread rubber layer
5 Belt layer
6 Inner liner
7 Bead filler
8 Side rubber support layer
10 Shoulder region

The invention claimed is:

1. A pneumatic tire comprising:
a carcass as a skeleton, the carcass formed of one or more carcass plies extending in a toroidal shape across a pair of bead parts;
one or more belt layers disposed on the outer side in the tire radial direction of a crown part of the carcass;
a tread part forming a tread surface part disposed on the outer side in the tire radial direction of the belt layer;
a pair of sidewall parts on the left and right sides of the tread part and the outer side in the tire width direction; and
a rubber support layer disposed on the sidewall part;
wherein a rubber composition for the tread part comprises:
a rubber component (A), a thermoplastic resin (B), and a reinforcing filler (C);
the rubber component (A) comprises 50% by mass or more of natural rubber: NR based on 100 parts by mass of the rubber component; and
the rubber support layer has a gauge thickness of 4 to 15 mm; and E'(1%, 30° C.)-E'(4%, 30° C.)≤1.5 MPa, wherein a dynamic storage elastic modulus E' of the tread part at 30° C. and at 1% dynamic strain is E'(1%, 30° C.), and a dynamic storage elastic modulus E' of the tread part at 30° C. and at 4% dynamic strain is E'(4%, 30° C.).

2. The pneumatic tire according to claim 1, wherein the reinforcing filler (C) comprises 70% by mass or more of silica in the rubber composition for the tread part.

3. The pneumatic tire according to claim 1, wherein the pneumatic tire is a run-flat tire.

4. The pneumatic tire according to claim 1, wherein the rubber composition for the tread part in the pneumatic tire comprises a modified styrene-butadiene copolymer rubber: modified SBR.

5. The pneumatic tire according to claim 4, wherein, in the tread part, the modified styrene-butadiene copolymer rubber is terminally modified with a hydrocarbyloxysilane compound represented by General Formula (IV) below:

(IV)

where q1+q2=3, with the provisio that q1 is an integer from 0 to 2, and q2 is an integer from 1 to 3; $R^{31}$ is a divalent aliphatic or alicyclic hydrocarbon group having from 1 to 20 carbons, or a divalent aromatic hydrocarbon group having from 6 to 18 carbons; $R^{32}$ and $R^{33}$ are each independently a hydrolyzable group, a monovalent aliphatic or alicyclic hydrocarbon group having from 1 to 20 carbons, or a monovalent aromatic hydrocarbon group having from 6 to 18 carbons; $R^{34}$ is a monovalent aliphatic or alicyclic hydrocarbon group having from 1 to 20 carbons, or a monovalent aromatic hydrocarbon group having from 6 to 18 carbons, where $R^{34}$s may be the same or different when q1 is 2; and $R^{35}$ is a monovalent aliphatic or alicyclic hydrocarbon group having from 1 to 20 carbons, or a monovalent aromatic hydrocarbon group having from 6 to 18 carbons, where $R^{35}$s may be the same or different when q2 is 2 or greater in General Formula (IV); or General Formula (V):

(V)

where r1+r2=3, with the provisio that r1 is an integer from 1 to 3, and r2 is an integer from 0 to 2; $R^{36}$ is a divalent aliphatic or alicyclic hydrocarbon group having from 1 to 20 carbons, or a divalent aromatic hydrocarbon group having from 6 to 18 carbons; $R^{37}$ is a dimethylaminomethyl group, a dimethylaminoethyl group, a diethylaminomethyl group, a diethylaminoethyl group, a methylsilyl(methyl)aminomethyl group, a methylsilyl(methyl)aminoethyl group, a methylsilyl(ethyl)aminomethyl group, a methylsilyl(ethyl)aminoethyl group, a dimethylsilylaminomethyl group, a dimethylsilylaminoethyl group, a monovalent aliphatic or alicyclic hydrocarbon group having from 1 to 20 carbons, or a monovalent aromatic hydrocarbon group having from 6 to 18 carbons, where $R^{37}$s may be the same or different when r1 is 2 or greater; and $R^{38}$ is a hydrocarbyloxy group having from 1 to 20 carbons, a monovalent aliphatic or alicyclic hydrocarbon group having from 1 to 20 carbons, or a monovalent aromatic hydrocarbon group having from 6 to 18 carbons, where $R^{38}$s may be the same or different when r2 is 2 in General Formula (V).

6. The pneumatic tire according to claim 1, wherein the rubber composition of the rubber support layer is a rubber composition formed by compounding: based on 100 parts by mass of a rubber component (a) containing 20% by mass or more of a modified conjugated diene polymer,
a filler (b), a thermosetting resin (c), a methylene donor (d), a thiuram vulcanization accelerator (e), and a sulfenamide vulcanization accelerator (f).

7. The pneumatic tire according to claim 6, wherein the rubber composition of the rubber support layer is a rubber composition formed by compounding:
from 60 to 100 parts by mass of the filler (b),
from 0.9 to 2.4 parts by mass of the thermosetting resin (c),
from 0.07 to 0.2 parts by mass of the methylene donor (d),
from 1.5 to 2.1 parts by mass of the thiuram vulcanization accelerator (e), and
from 3.2 to 4.5 parts by mass of the sulfenamide vulcanization accelerator (f),
based on 100 parts by mass of the rubber component containing 20% by mass or more of a modified conjugated diene polymer.

8. The pneumatic tire according to claim 7, wherein compounded amounts of the filler (b) and the thermosetting resin (c) in the rubber composition of the rubber support layer satisfy the following relationship:

$$1.0 \leq [\text{mass ratio}\{\text{compounded amount of thermosetting resin }(c)/\text{compounded amount of filler}(b)\}]\times 100 \leq 4.0 \quad (XIV).$$

9. The pneumatic tire according to claim 8, wherein compounded amounts of the thiuram vulcanization accelerator (e) and the sulfenamide vulcanization accelerator (f) in the rubber composition of the rubber support layer satisfy the following relationship:

$$0.45 \text{ mass ratio}[\text{compounded amount of thiuram vulcanization accelerator}(e)/\text{compounded amount of sulfenamide vulcanization accelerator}(f)] \leq 0.65 \quad (XV)$$

10. The pneumatic tire according to claim 1, wherein the rubber composition for the tread part comprises from 5 to 50 parts by mass of one or more thermoplastic resins (B) selected from the group consisting of a $C_5$ resin, a $C_5$-$C_9$ resin, a $C_9$ resin, a terpene resin, a terpene-aromatic compound resin, a rosin resin, a dicyclopentadiene resin, and an alkylphenolic resin, based on 100 parts by mass of the rubber component (A).

11. The pneumatic tire according to claim 10, wherein the reinforcing filler (C) comprises 70% by mass or more of silica in the rubber composition for the tread part.

12. The pneumatic tire according to claim 10, wherein the pneumatic tire is a run-flat tire.

13. The pneumatic tire according to claim 10, wherein the rubber composition for the tread part in the pneumatic tire comprises a modified styrene-butadiene copolymer rubber: modified SBR.

14. The pneumatic tire according to claim 13, wherein, in the tread part, the modified styrene-butadiene copolymer rubber is terminally modified with a hydrocarbyloxysilane compound represented by General Formula (IV) below:

(IV)

where q1+q2=3, with the proviso that q1 is an integer from 0 to 2, and q2 is an integer from 1 to 3; $R^{31}$ is a divalent aliphatic or alicyclic hydrocarbon group having from 1 to 20 carbons, or a divalent aromatic hydrocarbon group having from 6 to 18 carbons; $R^{32}$ and $R^{33}$ are each independently a hydrolyzable group, a monovalent aliphatic or alicyclic hydrocarbon group having from 1 to 20 carbons, or a monovalent aromatic hydrocarbon group having from 6 to 18 carbons; $R^{34}$ is a monovalent aliphatic or alicyclic hydrocarbon group having from 1 to 20 carbons, or a monovalent aromatic hydrocarbon group having from 6 to 18 carbons, where $R^{34}$s may be the same or different when q1 is 2; and $R^{35}$ is a monovalent aliphatic or alicyclic hydrocarbon group having from 1 to 20 carbons, or a monovalent aromatic hydrocarbon group having from 6 to 18 carbons, where $R^{35}$s may be the same or different when q2 is 2 or greater in General Formula (IV); or General Formula (V):

(V)

where r1+r2=3, with the proviso that r1 is an integer from 1 to 3, and r2 is an integer from 0 to 2; $R^{36}$ is a divalent aliphatic or alicyclic hydrocarbon group having from 1 to 20 carbons, or a divalent aromatic hydrocarbon group having from 6 to 18 carbons; $R^{37}$ is a dimethylaminomethyl group, a dimethylaminoethyl group, a diethylaminomethyl group, a diethylaminoethyl group, a methylsilyl(methyl)aminomethyl group, a methylsilyl(methyl)aminoethyl group, a methylsilyl(ethyl)aminomethyl group, a methylsilyl(ethyl)aminoethyl group, a dimethylsilylaminomethyl group, a dimethylsilylaminoethyl group, a monovalent aliphatic or alicyclic hydrocarbon group having from 1 to 20 carbons, or a monovalent aromatic hydrocarbon group having from 6 to 18 carbons, where $R^{37}$s may be the same or different when r1 is 2 or greater; and $R^{38}$ is a hydrocarbyloxy group having from 1 to 20 carbons, a monovalent aliphatic or alicyclic hydrocarbon group having from 1 to 20 carbons, or a monovalent aromatic hydrocarbon group having from 6 to 18 carbons, where $R^{38}$s may be the same or different when r2 is 2 in General Formula (V).

15. The pneumatic tire according to claim 10,
wherein the rubber composition of the rubber support layer is a rubber composition formed by compounding:
based on 100 parts by mass of a rubber component (a) containing 20% by mass or more of a modified conjugated diene polymer,
a filler (b), a thermosetting resin (c), a methylene donor (d), a thiuram vulcanization accelerator (e), and a sulfenamide vulcanization accelerator (f).

16. The pneumatic tire according to claim 15, wherein the rubber composition of the rubber support layer is a rubber composition formed by compounding:
from 60 to 100 parts by mass of the filler (b),
from 0.9 to 2.4 parts by mass of the thermosetting resin (c),
from 0.07 to 0.2 parts by mass of the methylene donor (d),
from 1.5 to 2.1 parts by mass of the thiuram vulcanization accelerator (e), and from 3.2 to 4.5 parts by mass of the sulfenamide vulcanization accelerator (f), based on 100 parts by mass of the rubber component containing 20% by mass or more of a modified conjugated diene polymer.

17. The pneumatic tire according to claim 16, wherein compounded amounts of the filler (b) and the thermosetting resin (c) in the rubber composition of the rubber support layer satisfy the following relationship:

$$1.0 \leq [\text{mass ratio} \{\text{compounded amount of thermosetting resin } (c)/\text{compounded amount of filler}(b)\}] \times 100 \leq 4.0 \quad \text{(XIV)}.$$

18. The pneumatic tire according to claim 10, wherein compounded amounts of the thiuram vulcanization accelerator (e) and the sulfenamide vulcanization accelerator (f) in the rubber composition of the rubber support layer satisfy the following relationship:

$$0.45 \text{ mass ratio}[\text{compounded amount of thiuram vulcanization accelerator}(e)/\text{compounded amount of sulfenamide vulcanization accelerator}(f)] \leq 0.65 \quad \text{(XV)}.$$

* * * * *